United States Patent [19]

Jacobs et al.

[11] Patent Number: 5,611,048
[45] Date of Patent: Mar. 11, 1997

[54] REMOTE PASSWORD ADMINISTRATION FOR A COMPUTER NETWORK AMONG A PLURALITY OF NODES SENDING A PASSWORD UPDATE MESSAGE TO ALL NODES AND UPDATING ON AUTHORIZED NODES

[75] Inventors: Dwayne C. Jacobs, Austin; James A. Wangler, Cedar Park, both of Tex.

[73] Assignee: International Business Machines Corporation, Armonk, N.Y.

[21] Appl. No.: 240,291

[22] Filed: May 9, 1994

Related U.S. Application Data

[63] Continuation of Ser. No. 969,672, Oct. 30, 1992, abandoned.
[51] Int. Cl.$^6$ ................................................. H01J 13/00
[52] U.S. Cl. ................ 395/200.09; 395/491; 395/188.01
[58] Field of Search .................................. 395/325, 800, 395/575, 491, 188.01, 187, 187.01, 200.09; 380/23

[56] References Cited

U.S. PATENT DOCUMENTS

| | | | |
|---|---|---|---|
| 4,218,738 | 8/1980 | Matyas et al. | 380/25 |
| 4,584,639 | 4/1986 | Hardy | 395/650 |
| 4,635,189 | 1/1987 | Kendall | 395/600 |
| 4,679,236 | 7/1987 | Davies | 380/23 |
| 4,698,757 | 10/1987 | Dill et al. | 395/187.01 |
| 4,799,153 | 1/1989 | Hann et al. | 395/325 |
| 4,802,217 | 1/1989 | Michener | 380/29 |
| 4,930,159 | 5/1990 | Kravitz et al. | 380/23 |
| 5,113,499 | 5/1992 | Ankney et al. | 395/325 |
| 5,204,961 | 4/1993 | Barlow | 395/725 |
| 5,226,172 | 7/1993 | Seymour et al. | 395/800 |
| 5,305,456 | 4/1994 | Boitana | 395/700 |

OTHER PUBLICATIONS

IBM Technical Disclosure Bulletin vol. 32, No. 8A Jan. 1990. Logon Assist for Multiple Logons.
IBM Technical Disclosure Bulletin vol. 28, No. 7 Dec. 1985, Accessing MVS Datasets From Distributed Systems Using SNA Networks.
IBM Technical Disclosure Bulletin vol. 34, No. 3 Aug. 1991, User Logon Profile.
IBM Technical Disclosure Bulletin vol. 32, No. 10B, Mar. 1990, Synchronized Connection.
IBM Technical Disclosure Bulletin vol. 16, No. 8, Jan. 1974, Cryptographic Password Management System.
IBM Technical Disclosure Bulletin vol. 34, No. 8, Jan. 1992, Home Terminal Access To Lan Servers Utilizing Host Connection.
IBM Technical Disclosure Bulletin vol. 30, No. 3, Aug. 1987, Integration of Local Area Networks Into RSCS–Based Networks.
IBM Technical Disclosure Bulletin vol. 32, No. 1, Jun. 1989, Logon Security, and Accounting Enhancements In Computing Systems.

*Primary Examiner*—Thomas C. Lee
*Assistant Examiner*—Sang Hui Kim
*Attorney, Agent, or Firm*—Jeffrey S. LaBaw

[57] ABSTRACT

A remote password administration facility operating on the network is divided in client and server programs and provides coordination between a mainframe and a network security system. A password update message is generated by the client program and transmitted across the network to a server system which acts as a gateway server to the mainframe. The password is updated at the server system in the network security system. The gateway server is coupled to a mainframe system via an emulator session. The server scans the logon profile database to determine whether the user id is authorized to access the mainframe. If so, the password update message is sent to the second security system resident in the mainframe. The server program cooperates with the emulator program to send the password update message to the mainframe security system and determine whether the password was successfully updated.

19 Claims, 11 Drawing Sheets

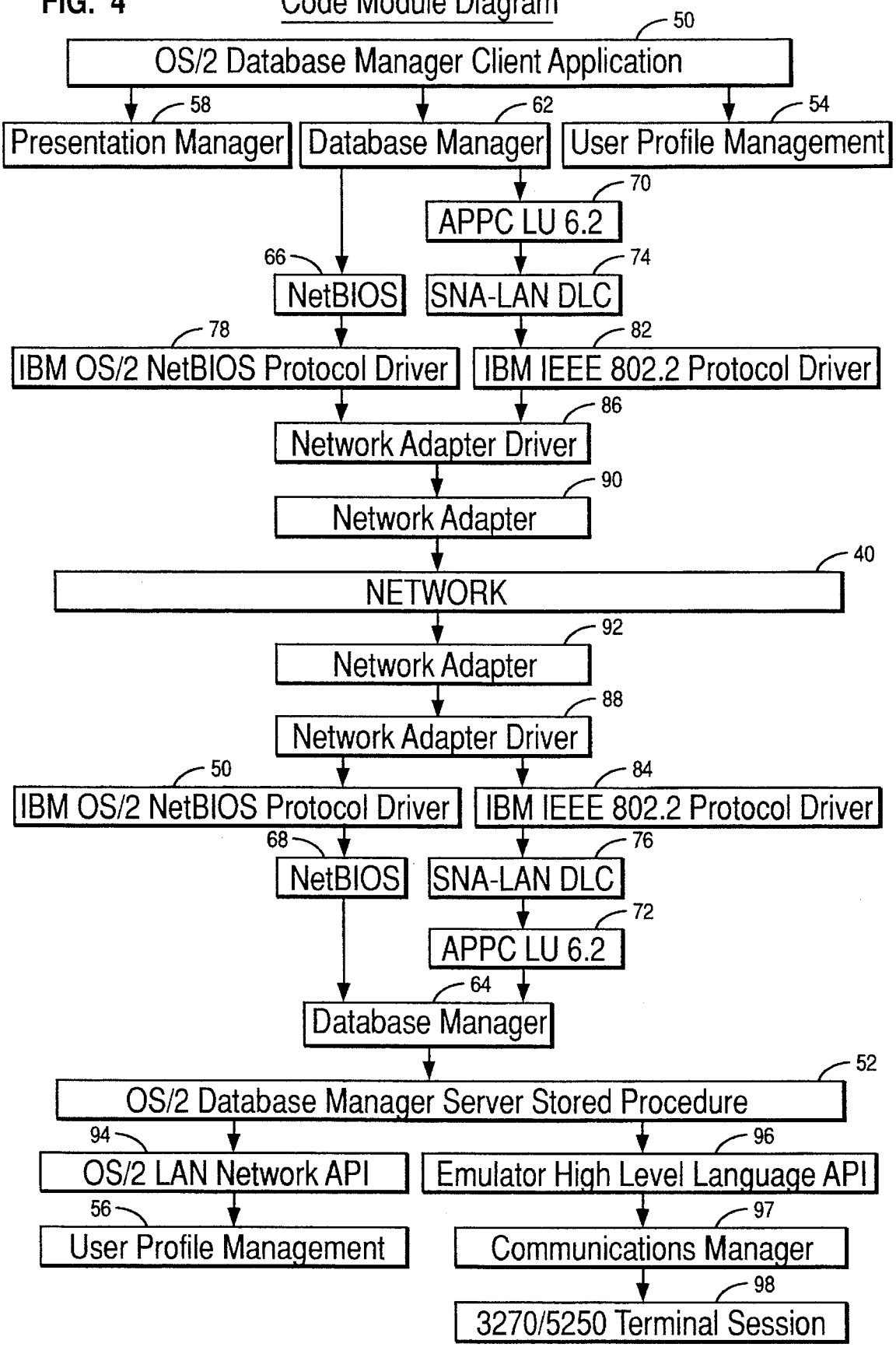
FIG. 4 Code Module Diagram

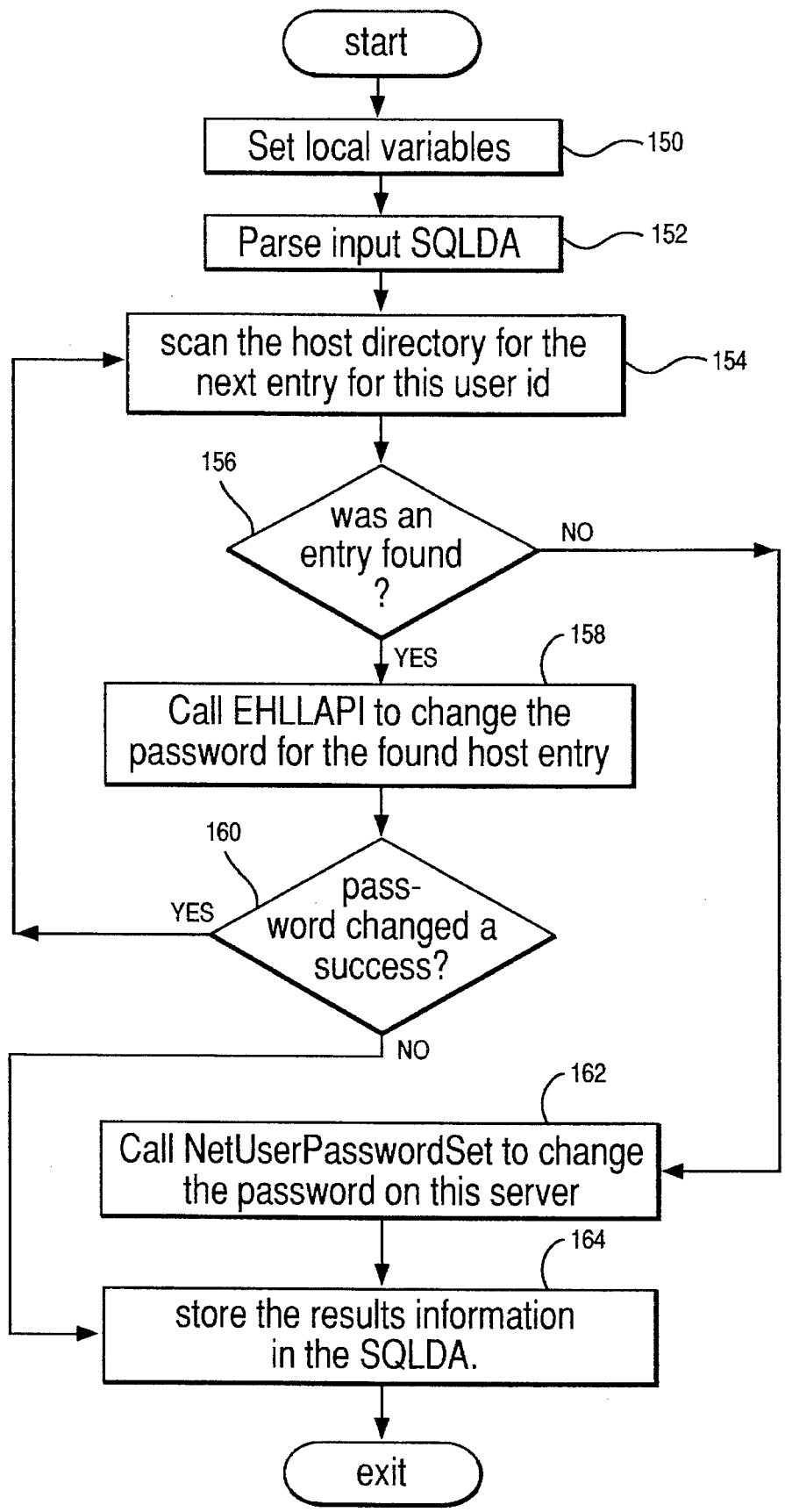
FIG. 6   Database Manager Server Flow Chart

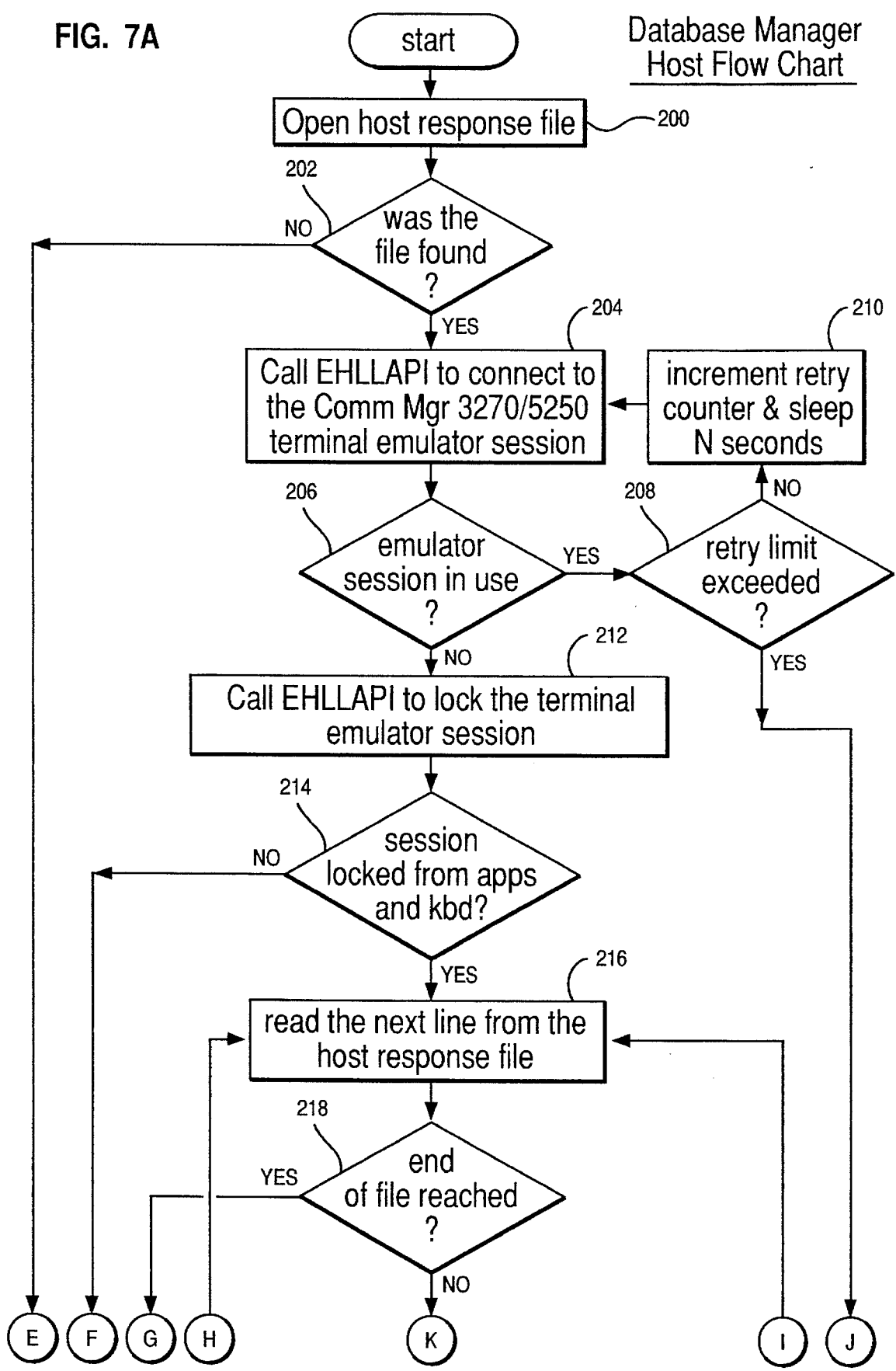
FIG. 7A     Database Manager Host Flow Chart

REMOTE PASSWORD ADMINISTRATION FOR A COMPUTER NETWORK AMONG A PLURALITY OF NODES SENDING A PASSWORD UPDATE MESSAGE TO ALL NODES AND UPDATING ON AUTHORIZED NODES

This is a continuation of application Ser. No. 07/969,672 filed Oct. 30, 1992 now abandoned.

BACKGROUND OF THE INVENTION

This invention relates generally to data processing systems in a network environment. More particularly, it relates to a method and system for administrating passwords on remote machines which use different operating and security systems.

It is becoming increasingly prevalent to couple a plurality of data processing systems in an interconnected computing environment such as a Local Area Network (LAN) or Wide Area Network (WAN). These networks are becoming increasingly complicated with several different LAN networks passing messages according to different protocols coupled together within processing systems for multiple vendors in the network. It is also becoming popular to couple a mainframe type data processing system to the network through a gateway server.

With the complexity and increasing size of such networks, it is also recognized that data within the system and transmitted between the various data processing systems must be protected against unauthorized disclosure, destruction and modification. The process by which a system knows that a potential user is authorized to obtain access to a system is known as "Authentication". Typically, a userid and a password are used in the authentication process to prove the legitimacy of the user attempting to logon. After authentication on all the systems to which the user is allowed access, information can be passed between the mainframe system and the personal computers on the network. Most security systems require that a password be chagned after a period of time to reduce the likelihood of unauthorized access.

Unfortunately, the security systems used for the authentication process generally differ on the two types of systems. For example, a personal computer running on the OS/2™ operating system with Extended Services™, both manufactured by the IBM Corporation uses the User Profile Management (UPM) security system and IBM 370 mainframe systems may use the Resource Access Control Facility (RACF) security system. Each security system maintains its own plurality of encrypted user logon profiles and has its own authentication process. The user password on the gateway machine on the network and UPM must also be on the mainframe and RACF. The user id and password must be updated on all systems or the user will not be able to access all the data in the network. Further, the process by which a new password is entered and the criteria for a valid password vary between security systems. Currently, it is left to the user to ensure that a password changed at the local node is also changed at all remote nodes which may include a mainframe. The presence of the two security systems complicates matters, it would be highly desirable to coordinate the two security systems.

The prior art has failed to provide such a coordination means.

SUMMARY OF THE INVENTION

It is therefore an object of the invention to administrate passwords across two or more security systems coupled to a network.

It is also an object of this invention to coordinate passwords across two or more security systems.

These and other objects are accomplished by a remote password administration facility operating on the network. In the preferred embodiment of the invention, the facility is divided in client and server programs. A password is updated at a client system coupled to the network which uses a first type of security system. A password update message is generated by the client program of the remote password administration facility and transmitted across the network to update the remote systems to which the user is entitled access. One of the remote systems is a second system also running on the first type of security system where the server program of the remote password administration facility is resident. The second system acts as a gateway server to the second type of data processing system such as a mainframe which uses a second type of security system. Preferably, the gateway server is coupled to the second type of system, e.g., a mainframe system, system mainframe system via an emulator session. After the password is updated in the first security system at the server, the server scans the logon profile database to determine whether the user id is authorized to access the mainframe. If so, the password update message is sent to the second security system resident in the mainframe. A handshaking program operates at the server with the emulator program to send the password update message to the second security system and determine whether the password was successfully updated.

BRIEF DESCRIPTION OF THE DRAWINGS

These and other features and objects of the present invention will be more readily understood with reference to the attached drawings and following description.

FIG. 4 is a code module diagram of the software code modules resident in the memories of the client and server systems.

FIG. 6 is the flow diagram for the remote password administration process on the server system.

FIGS. 7a and 7b are flow diagrams of the transmission of the password update message to the host mainframe.

DETAILED DESCRIPTION OF THE DRAWINGS

The invention can be incorporated in a variety of computers which communicate via a network. The processor unit could be for example, a personal computer, a mini computer or a mainframe computer, running a plurality of computer displays. The network may be a local area network or a wide area network or a larger teleprocessing system. One preferred computer system for client and server machines is IBM's PS/2 series, although the specific choice of a computer is limited only by the memory and disk storage requirements of multimedia programming. For additional information on IBM's PS/2 series of computer readers are referred to Technical Reference Manual Personal System/2 Model 50, 60 Systems and (IBM Corporations Part Number 68x2224, Order Number S68X-2224 and Technical Reference Manual) Personal System/2 (Model 80) IBM Corporation, Part Number 68X22256, Order Number S68X-2256.

Figure 1:
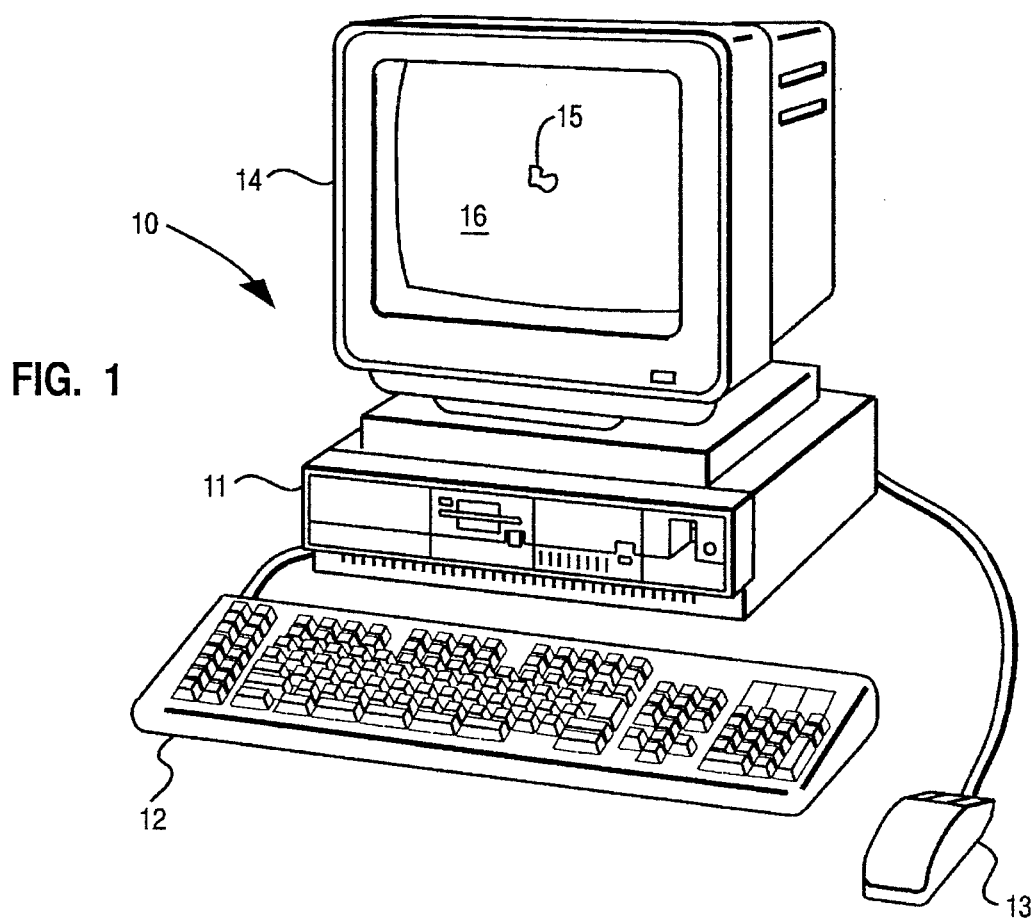
FIG. 1 shows a computer comprising a system unit, a keyboard, a mouse and a display.

In FIG. 1, a personal computer 10, comprising a system unit 11, a keyboard 12, a mouse 13 and a display 14 are depicted. The screen 16 of display device 14 is used to present the visual components of a graphical user interface. The graphical user interface supported by the operating system allows the user to use a "point and shoot" method of input by moving the pointer 15 to an icon representing a data object at a particular location on the screen 16 and press one of the mouse buttons to perform a user command selection. The data object selected will appear on a window which may present any number of selected views of the object.

Figure 2:
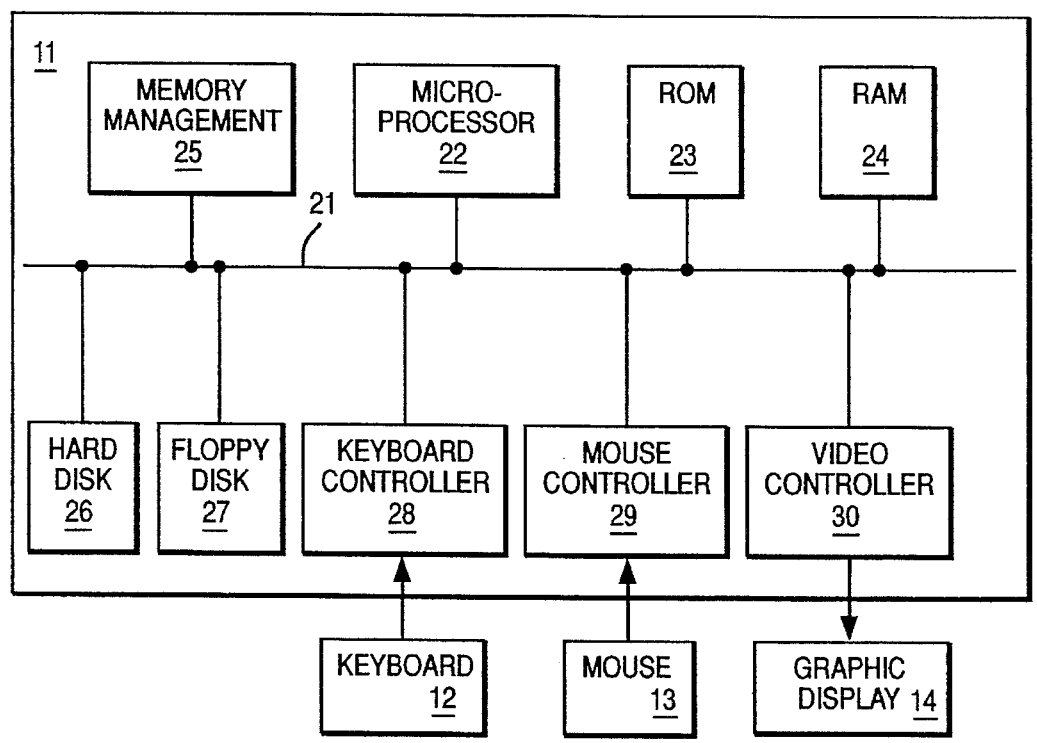
FIG. 2 is a block diagram of a components of the computer shown in FIG. 1.

FIG. 2 shows a block diagram of the components of the personal computer shown in FIG. 1. The system unit 11 includes a system bus or busses 21 to which various components are coupled and by which communication between the various components is accomplished. A microprocessor 22 is connected to the system bus 21 and is supported by read only memory (ROM) 23 and random access memory (RAM) 24 also connected to system bus 21. A microprocessor in the IBM PS/2 series of computers is one of the Intel family of microprocessors including the 8088, 286, 386 or 486 microprocessors, however, other microprocessors included, but not limited to Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 23 contains among other code the Basic Input/Output System (BIOS) which controls basic hardware operations such as the interaction and the disk drives and the keyboard. The RAM 24 is the main memory into which the operating system and multimedia application programs are loaded. The memory management chip 25 is connected to the system bus 21 and controls direct memory access operations including, passing data between the RAM 24 and hard disk drive 21 and floppy disk drive 27. A CD ROM 28 also coupled to the system bus 21 is used to store the large amount of data such as in a multimedia program or presentation.

Figure 3:
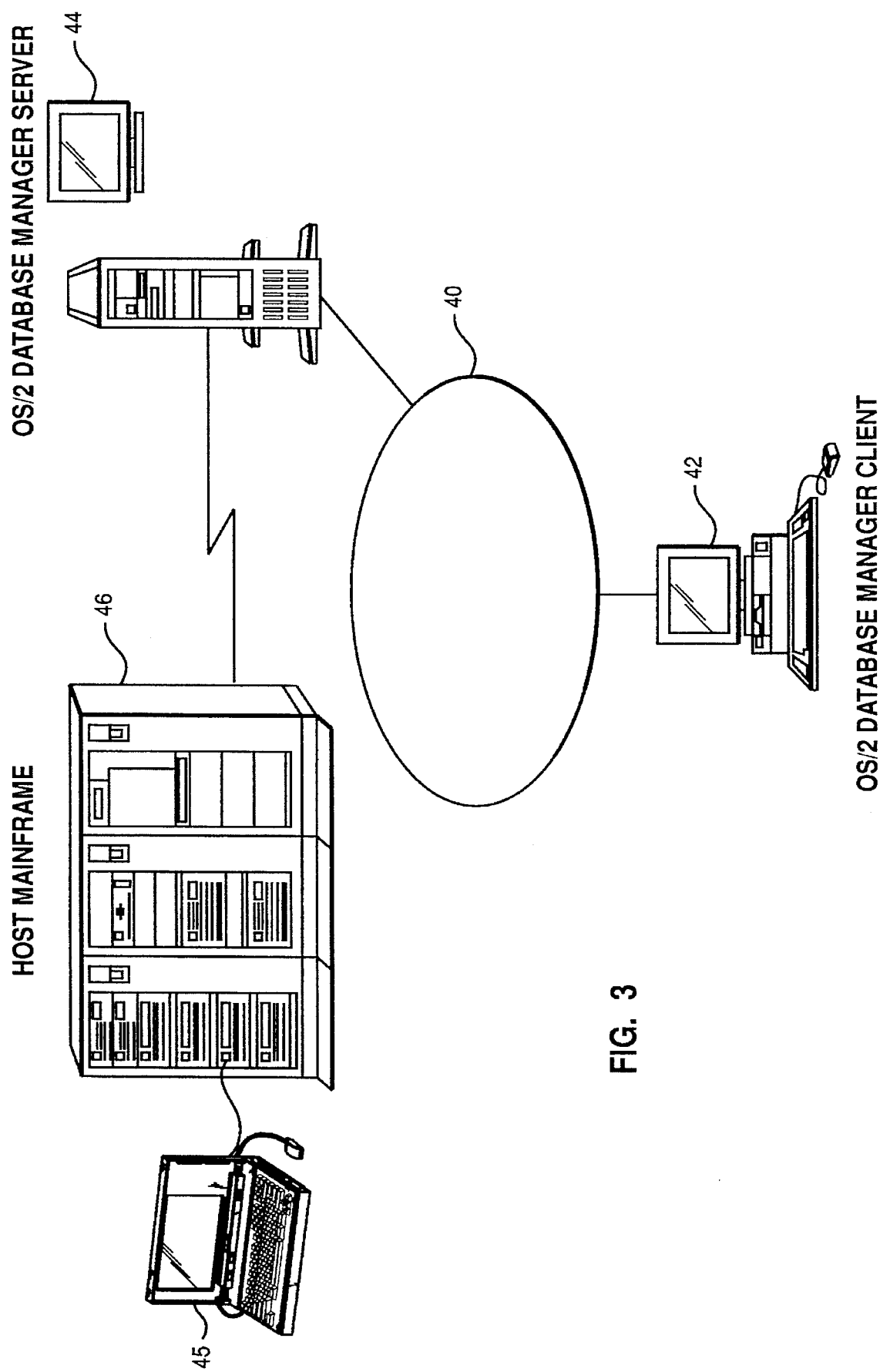
FIG. 3 is a simplified depiction of a Local Area Network coupled to client and server systems, the server system being further coupled to a host mainframe.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, and the video controller 30 is the Q hardware interface for the display 14. Further, a LAN adapter 32 is coupled to the system bus 21 and provides communication capabilities with the network FIG. 3 is a greatly simplified illustration of a Local Area Network in which the present invention is implemented. Typically, a network environment is much more complicated, consisting of different LAN technologies, multiple vendors and multiple adapters. Most vendors write to a variety of protocols according to the IEEE and International Standard Organization standards ISO 8802-2, ISO, 8802-3, ISO 8802-4, ISO 8802-5 and ISO 8802-7 to assure compatibility. The connection medium 40 is preferably, an IBM Token Ring, however, it could also be an Ethernet or PCNet or other type of LAN network. The OS/2 Database Manager Client System 42 is coupled to the LAN 40 and communicates to the OS/2 Database Manager Server System 44. The Client System 42 can use the server system 44 for a variety of functions such as file sharing, distributed applications and databases, communications printing and other services, but in this example is primarily concerned with the gateway service to the host mainframe 46. It is also possible that these services would be divided on a plurality of servers coupled to the LAN 40 to optimize efficiency. Coupled to the host mainframe 46 are a plurality of user terminals 48, only one of which is illustrated.

The security system resident on the client system 42 and server system 44 is preferably the User Profile Management Facility (UPM), which is part of the Extended Services™ program which is offered by the IBM Corporation. UPM is automatically installed on each system on which Extended Services is installed. Extended Services comprises Communications Manager and Database Manager components which allow comprehensive communication and database functions within a network for computer systems which use the OS/2 operating system. Exended Services is described in many publications of the IBM Corporation including IBM Extended Services for OS/2 Hardware and Software Reference Order No. SO4G-1014-00. UPM is also used in the IBM OS/2 Local Area Network server. This system software is described in the following publications available from the IBM Corporation and incorporated herein by reference: IBM Operating Systems/2 Local Area Network Server Version 2.0 Information and Planning Guide (G236-0162); IBM Local Area Server Programs (G360-2753); and IBM Local Area Network Technical Reference (SC30-3383).

User Profile Management (UPM) is a security system which provides authorization checking by means of a logon facility and administration of user ID's and passwords. UPM always requires a user ID and usually also requires a password for access to the system. Authorization through UPM is necessary before the local system or remote systems may be utilized. UPM is local to each workstation and contains unique information specific to that system. To access a system either locally or remotely, the user s id and password must be defined through UPM on each system accessed. UPM can be used to define a user logon profile which stores information enabling user's logon to remote systems. The user logon profile contains, userid, password, the remote name of the system and the remote type of the system being accessed, e.g., LU 6.2. If the remote option is used, when the user logons on the local system, the user logon profile is activated to authorize access to the remote systems automatically. However, UPM does not provide automatic password update services to remote systems on the network. Further information on UPM may be found in IBM Extended Services for OS/2 Guide to User Profile Management (SO4G-1114-00) available from the IBM Corporation and hereby incorporated by reference.

One security system used on the host mainframe is the Resource Access Control Facility (RACF) also an IBM product. Host mainframes in the IBM 370 architecture use either the VM or MVS operating systems which can be equipped with a security system such as RACF. When a user logson to the host and sends his user ID and password, the Control Program (CP) which manages the user's logon process, as well disk space and virtual machines, sends the user ID to the RACF service machine. The RACF service machine performs validation of the user ID and password and contains a one way encrypted database using a Data Encryption System (DES) algorithm. Information on the RACF security system can be found in RACF General Information Manual, Order No. GC280722 and RACF General User's Guide, Order no. SC 281341 both publications of the IBM Corporation and hereby incorporated by reference.

While the invention will be described in terms of specific set of hardware and software one skilled in the art will recognized that other network and mainframe security systems, software and hardware can be supported without undue experimentation.

FIG. 4 is an architectural block diagram of one preferred embodiment of the code modules resident in the client system and the server system. Most of the code modules are preexisting modules used for message transport, however, the figure is included to show one means of many to pass messages between the client and server portions of the remote password administrator. Generally, the software configuration is known as the LAN Adapter and Protocol Support (LAPS) and consists of network communication software to support LAN connectivity. LAPS is a combination of Network Driver Interface Specification (NDIS) compliant protocol drivers, NDIS compliant network adaptor drivers, Application Program Interface (API) support software and configuration and installation software for the drivers. In the preferred embodiment, the remote password administration is configured as an OS/2 Database Manager Client application 50 in the client system and an OS/2 Database Manager Server stored procedure 52 at the server system. However, many client-server architectures could be used without undue experimentation. The remote password administration facility modules are coupled to the User Profile Management modules 54, 56 which provide system security at both workstations.

Presentation Manager 58 displays the applications which run on the client systems in a consistent manner in the graphical user interface including the client portion 50 of the Remote Password Administration Facility (RPAF). Database Manager 62, 64 provides communication facilities to its applications including the remote password administrator as Database Manager client and server applications 50, 52. Database Manager 62, 64 can communicate with the network either through the NetBIOS 66, 68 or Advanced Program-to-Program Communication for LU 6.2 (APPCU 6.2) 70, 72 Systems Network Architecture Local Area Network Dial Link Control (SNA-LAN DLC) 74, 76 protocol stacks. Both of these protocol stacks provide programming interfaces to the LAN so that an application program can have LAN communications without knowledge and responsibility of data link control.

NetBIOS 66, 68 is coupled to the NetBIOS protocol driver 78, 80 and SNA-LAN DLC 74, 76 is coupled to 802.2 protocol driver 82, 84 for logical link control communications to the Medium Access Control layer provided by the Network Adapter Drivers 86, 88. The Network Adapter Drivers 86, 88 are software modules that shield the other code modules in the system from the hardware interfaces of the Network Adapters 90, 92 and the Network 40.

Figure 5A:
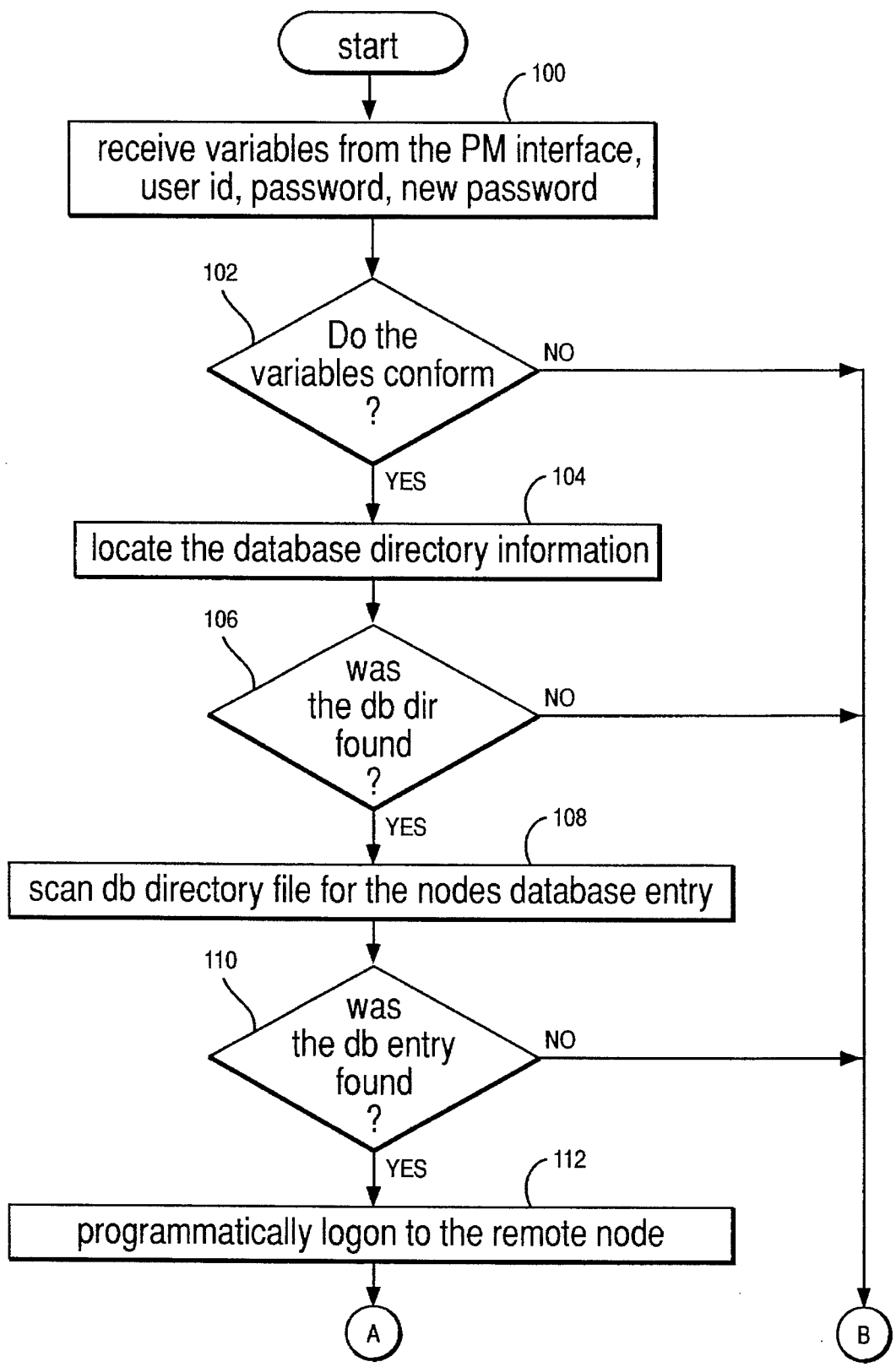
FIGS. 5a–c are flow diagrams of the remote password administration procedure which takes place in the client system.
Figure 5B:
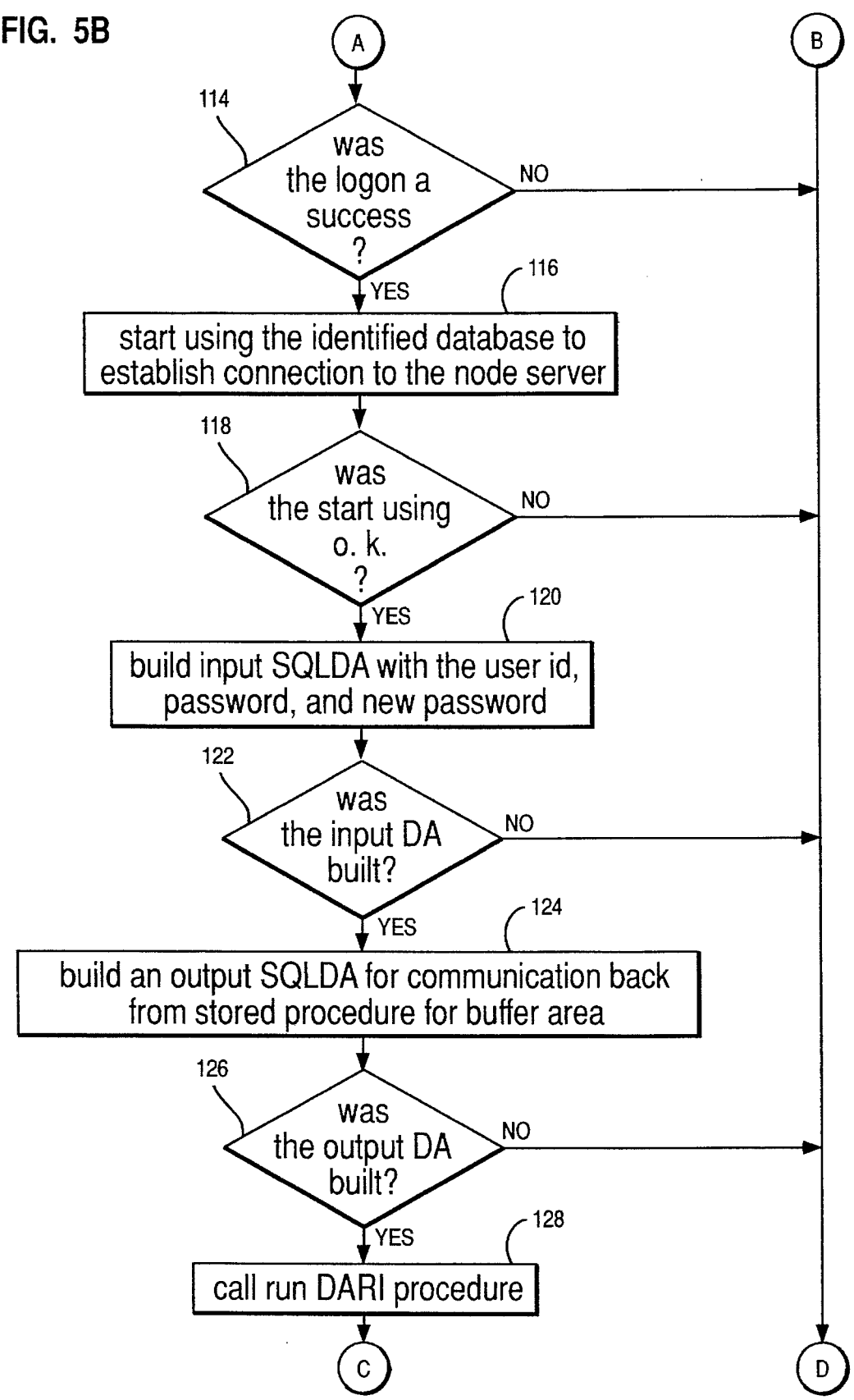
Figure 5C:
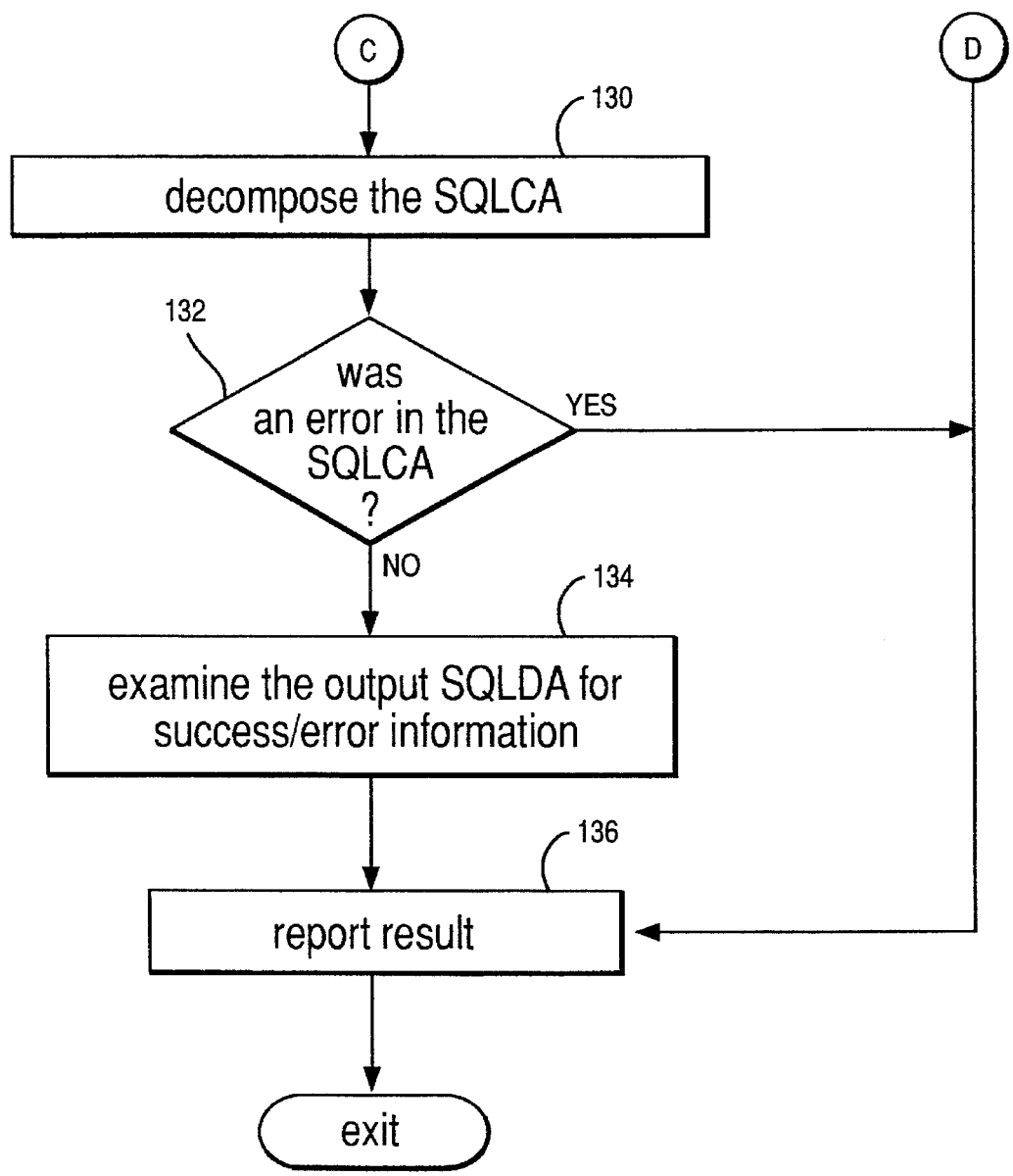
Figure 9:
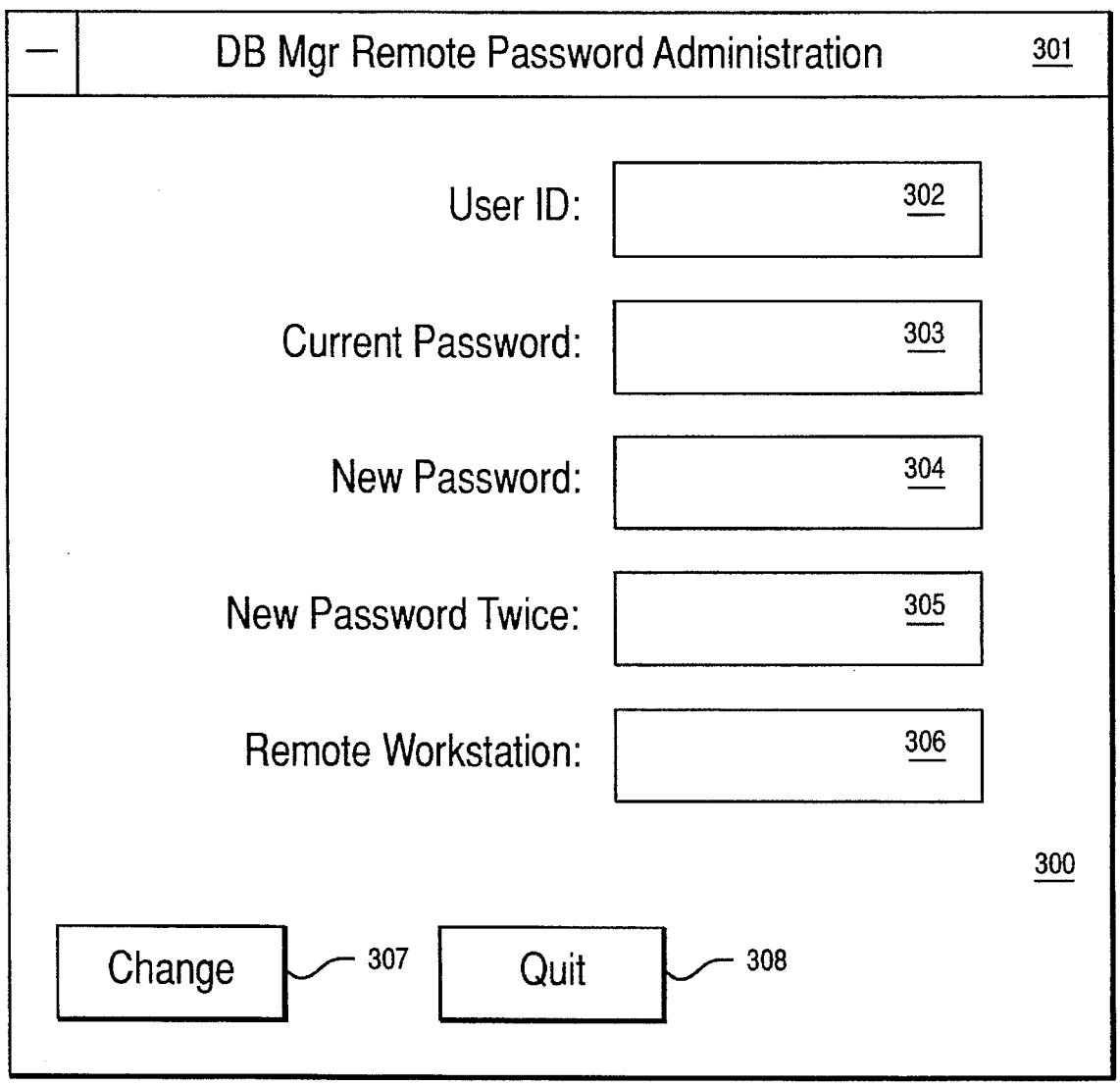
FIG. 9 is a representative user interface profile for remote password administration.

FIGS. 5a–5c are flow diagrams of one preferred embodiment of the Remote Password Administration process steps which take place on the client server system. The process begins in step 100 of FIG. 5a where the userid, password and new password variables are received from the Presentation Manager Interface. The interface is depicted in FIG. 9. Next, a test is run in step 102 to determine whether the variables conform to the UPM security system rules for userid, password and new password. Optionally, a test can be performed to see if the password and new password, etc, also conform to the RACF rules. If the variables do conform, the database directory which contains database and node information is located in step 104. A test is performed to determine whether the database directory was found, step 106. If so, in step 108 the database directory file is scanned for the remote databases and nodes on the LAN in which the user ID, password and new password information must be updated. This may include the gateway server and the mainframe coupled to the gateway server. A test is performed to determine whether a database entry for a remote node was found, step 110. If so, the client begins logon to the remote node, step 112.

The process continues in FIG. 5b, where a test is performed in step 114 to determine whether the remote logon was a success. If it was, the client begins using the identified database to establish connection to the node. A 'start using' call, step 116, to Database Manager establishes a connection to the remote node so that a remote procedure call can be initiated. Next, a test is performed to determine whether the process to establish connection to the node was successful, step 118. If so, an input Structured Query Language Data Area (SQLDA) with the user ID, password and new password is built, step 120. An SQL data area is used in the preferred embodiment as the client and server programs are implemented in Database Manager. Other implementations could use other data structures. In step 122, a test is performed to determine whether the input data area was built. If so, an output SQLDA is built, in step 124, containing buffers for the results of the remote password change process and is stored for communication back to the client when the server machine replies. Next, a test is performed to determine whether the output data area is built, step 126. If so, in step 128, the Database Application Remote Interface (DARI) procedure is called from the server machine. At this point, the client system waits for a reply from the server.

In step 130 of FIG. 5C, the SQL Communication Area (SQLCA) has been returned from the server machine and decomposed. Next, the test is performed to determine whether there is an error in the SQLCA, e.g., a database or communications error, in step 132. If not, the output SQLDA is examined for success/error information, step 134, i.e. the output data area is searched for password update results such as the success or failure of the remote password update. The process continues to step 136 where the results of the remote password administration process are reported to the user in the Presentation Manager Interface. If the tests in steps 102, 106, 110, 114, 118, 122, 126 or 132 fail, the result is reported to the user in the interface in step 136 and the process ends.

FIG. 6 depicts a preferred embodiment of the Remote Password Administration facility procedure which takes place on the server system. In step 150, the local variables are set, e.g., local information including file buffers, file handles, results buffers, user ID and password buffers. Next, the SQLDA input from the client system is parsed for the user ID, password and new password variables, step 152. With this data, the server system scans the host directory in step 154 for the next entry for this user ID.

If an entry for the user ID is found in the host directory, which contains emulator information and host response file information, step 156, the server machine calls a handshaking program written in Emulator High Level Language Application Programming Interface (EHLLAPI) to change the password for the user id at the host in step 158. EHLLAPI is an application programming interface (API) which allows 3270/5250 terminal emulator interaction on behalf of the user and is described in the Extended Services for OS/2 EHLLAPI Programming Reference Order No. SO4G-1027-00, a publication of the IBM Corporation and is hereby incorporated by reference. An EHLLAPI application program acts as a programmed operator that performs and monitors activities that are usually done by a user. EHLLAPI services include functions which query a system or system session for data, send keystrokes to a host, intercept keystroke send and receive files and many others. An OS/2 Advanced Program-to-Program Communications (APPC) interface session to a host APPC transaction process could also be used to update the RACF password directory. However, only mainframes operating on MVS/ESA Version or higher use this APPC interface, so from a commercial standpoint, an EHLLAPI interface program is preferred. Step 158 is depicted in greater detail in FIGS. 7a and 7b.

In step 160, a test is performed to determine whether the password was changed as the user could access multiple hosts from the client GUI. If the password was changed, the host directory is scanned for another entry for this user ID. In all probability, another entry will not be found and the process will continue to step 162 which uses a NetUser password utility to change the password on the server system. The results from successful change of password or unsuccessful change of password at both the server and the host are stored in the output SQL data area in step 164 and returned to the client server.

Figure 7B:
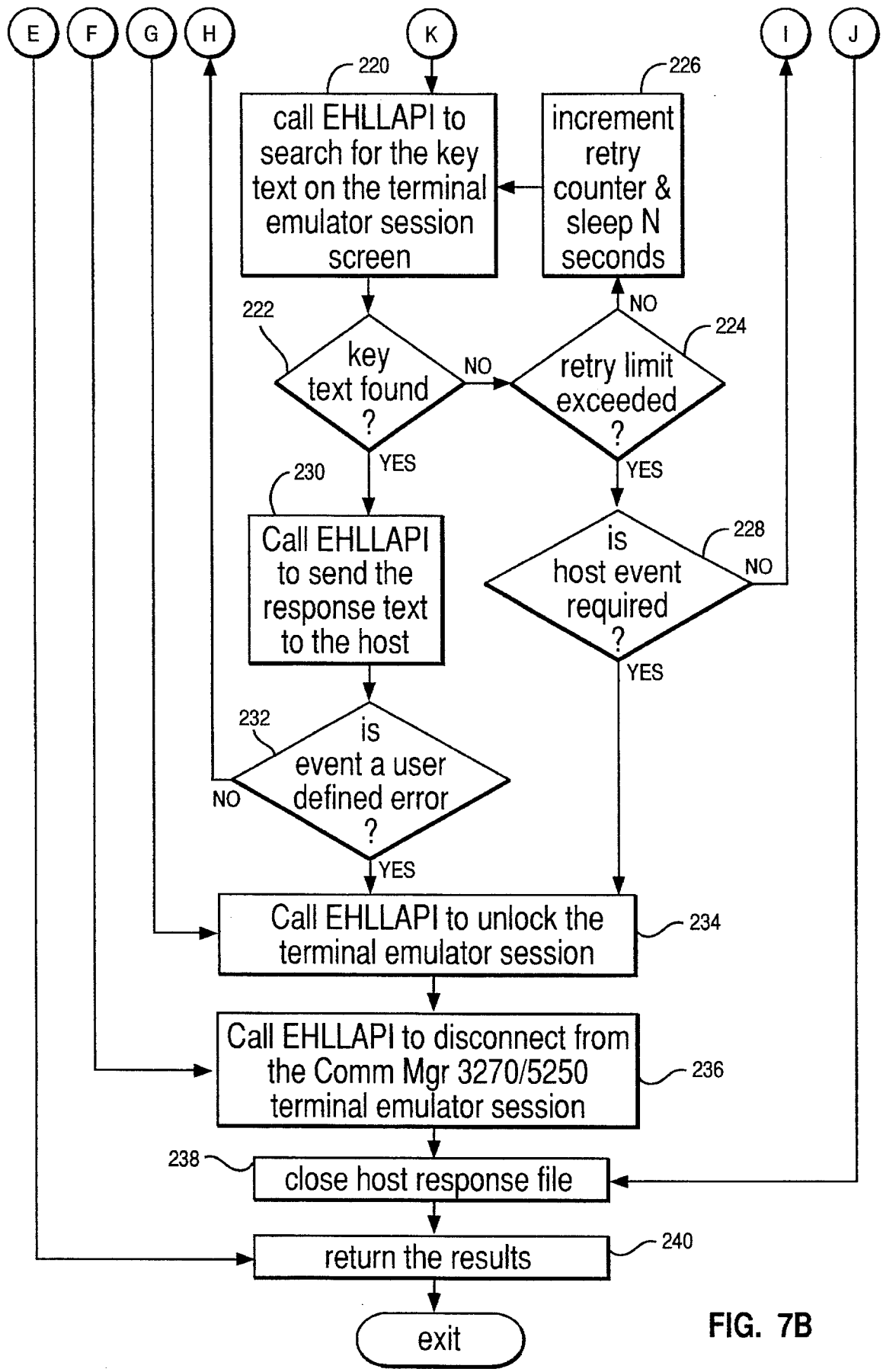

The Remote Password Administration process which takes place in step 158 is illustrated in FIGS. 7A and 7B in greater detail. First, the server system opens the host response file in step 200. The host response file contains the necessary information to update the password information at the RACF security system. Examples are given below. Next, a test in step 202 is performed to determine whether the file was found, if so, the Emulator High Level Language Application Programming Interface (EHLLAPI) procedure is called to connect with the terminal emulator system in step 204. If the emulator system is in use, step 206, and the retry limit is not exceeded, step 208, the retry counter is incremented and the server system will repeatedly attempt to call the EHLLAPI program to connect with the emulator for a given period of time steps 210, 204. If the emulator session is not in use, EHLLAPI is called to lock the terminal emulator session, step 212.

Next, a test is performed in step 214 to determine whether the emulator session is locked from the applications and keyboard so that extraneous input does not occur. If so, the first line from the host response file is read in step 216. A test is performed in step 218 whether the end of the file is reached. If not, the EHLLAPI program is called to search for the key text on the terminal emulator session screen, step 220. "Key text" is a certain string of characters displayed by the host which indicates that the host is in a particular state. Depending on the state of the host system, the EHLLAPI program will perform different function. This will be described in greater detail in connection with FIG. 8 below.

A test is performed in step 222 to determine whether the key text was found. If the key text was not found and the retry limit was not exceeded, step 224, the retry counter is incremented, step 226, and the EHLLAPI program is called to search for the key text and the emulator screen again in N seconds step 220. If key text is found, the EHLLAPI program is called to send the response text to the host in step 230. If the event is not a user defined error, step 232 returns the process to step 216 where the next line from the host response file is read. If the end of the file is reached or the event is a user defined error, the EHLLAPI program is called to unlock the terminal and emulator session in step 234. Next, the EHLLAPI program is called to disconnect from the Communications Manager 3270 emulator session, step 236. The host response file is closed in step 238 and the results are returned to the server in step 240.

Two sample host response files follow below:

This is an example response file for changing a VM2 password.

| When | "MSGl0" | Say | "VM2 #U@E" | |
|------|---------|-----|------------|---|
| For | "not in CP" | Say | "logoff@E" | Return "invalid user id #"#U#"." |
| When | "password" | Say | "#P/#N/#N@E" | / this line changes the password |
| For | "incorrect" | Say | "logoff@E" | Return "Invalid password #"#P#"." |
| For | "INVALID" | Say | "logoff@E" | Return "Invalid new password #"#N#"." |
| If | "SYSNEWS" | Say | "@3" | |
| If | "HOLDING" | Say | "@C" | |
| If | "MORE" | Say | "@C" | |
| When | "Ready₃" | Say | "logoff@E" | |

This is an example response file for changing an MVS password.

| When | "access code:" | Say | "TSO4@E" | |
|------|----------------|-----|----------|---|
| When | "USERID -" | Say | "#U@E" | |
| When | "Password" | Say | "#P#T#N@E" | / these two lines |
| When | "verification" | Say | "#N@E" | / change the password |
| When | "***" | Say | "@E" | |
| When | "OPTION" | Say | "x@E" | |
| When | "READY" | Say | "logoff@E" | |

The entries in the response files are order dependent, the statements execute in the order in which they appear. Each statement has a time-out value associated with it. If the first clause of the statement is not satisfied within the time-out value specified, then a time-out action occurs. For the 'WHEN' clauses, a time-out causes an exit from the response file; for the 'IF' and 'FOR' clauses, a time-out causes control to be passed to the next statement.

In the host response files, comments begin with a slash and continue to the end of the line. The comment may be on a line by itself, or at the end of a line of code. The following reserved keywords are case independent: When, Say, If, For, Return.

WHEN-SAY STATEMENT When "xxxx" Say "yyyy"

This means that a required/expected event has a given response. Example: "When password" Say "#P/#N/#N@E" means that the remote password administration facility will wait for N seconds for the phrase "password" to appear next on the host display screen. If it does, then remote password administration facility responds back to the host with the string for a password change (old/new/new) followed by the enter key. It can then pass control on to the next line in the response file.

If the phrase "password" does not appear within a time out period, then the RPAF exits from the response file and terminates execution of the utility. An error message to this effect will be returned to the client's display portion of the RPAF.

IF-SAY STATEMENT If "xxxx" Say "yyyy"

This means that an optional event has a given response. Example: "If HOLDING" Say "@C" means that the RPAF will wait for N seconds for the phrase "HOLDING" to appear next on the host display screen. If it does, then the facility responds with the CLEAR key and passes control to the next line in this response file. If the phrase "HOLDING" does not appear within N seconds, the RPAF passes control on to the next line in this response file.

FOR-SAY-RETURN STATEMENT For "xxxx" Say "yyyy" Return "zzz"

This means that a possible error has a given response, and the Return string appears at the client's display screen. Example: "For INVALID" Say "logoff@E" Return "Invalid new password #"#N#" "means that the facility will wait for N seconds for the phrase "INVALID" to appear next on the display screen. If it does, the RPAF responds with the phrase "logoff" plus the ENTER key to the host. The RPAF passes the Return string "Invalid new password "new password"" back to the client portion of the RPAF and then exits from the response file to terminate execution of the facility. If the phrase "INVALID" does not appear within N seconds, then the RPAF passes control on to the next line in this response file.

The strings are encoded as follows:

STRING SUBSTITUTION: P1 #P=current password string from the client

N=new password string from the client

U=userid string from the client

T=condition @T (tab right) executed if preceding string less than 8 characters, used for fixed input fields.

KEY STROKES

@T=tab right; field advance.

@B=back tab; tab left.

@E=enter

@C=clear

@q=end

@0=home

@1–@9=F1–F9

@a–@o=F10–F24

Figure 8:
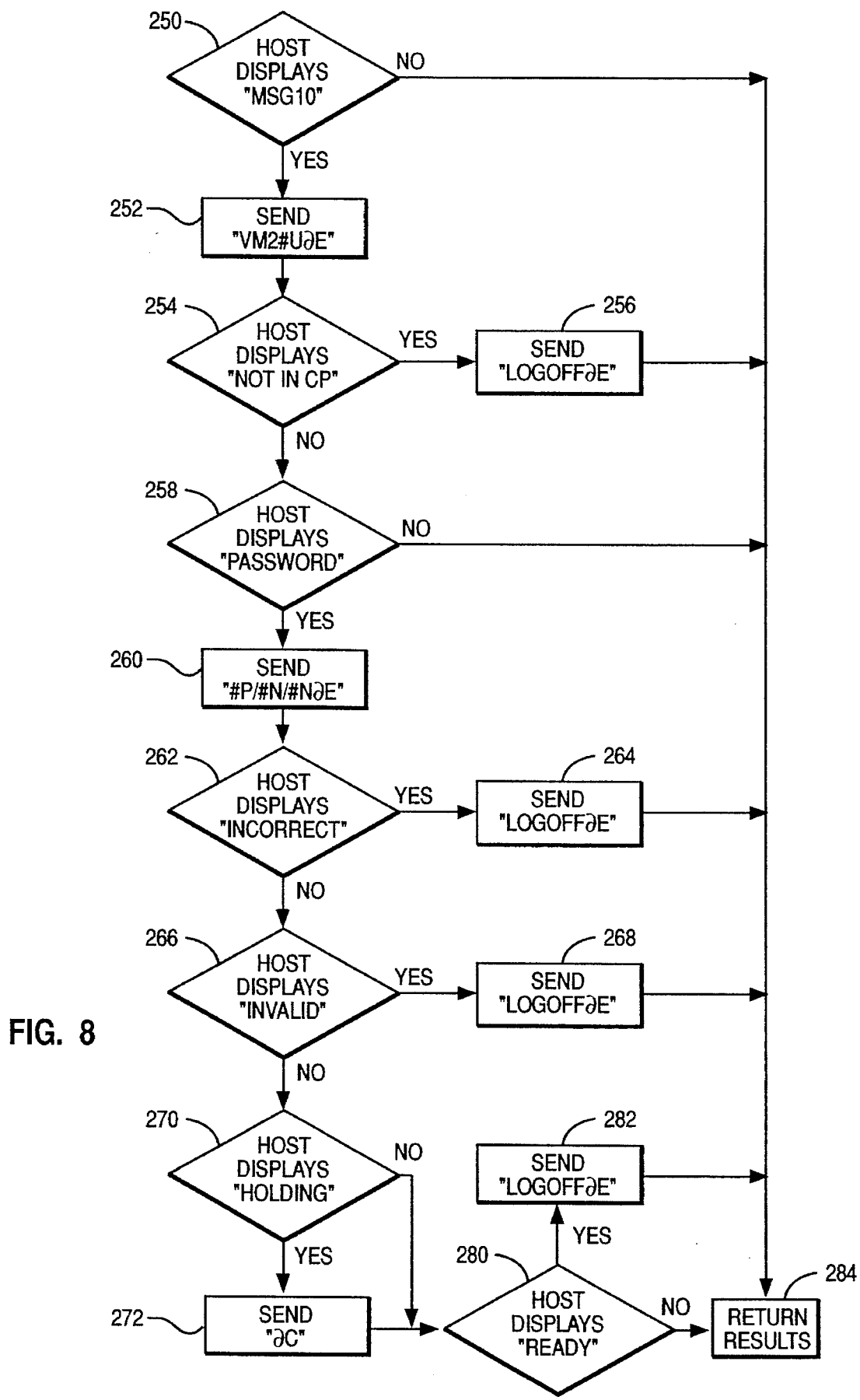
FIG. 8 is a flow diagram of the handshaking between the server and the security system on the mainframe using a host response file.

FIG. 8 is a flow diagram of the handshaking between EHLLAPI portion of the server and the mainframe security system using a host response file. The host response file for changing a VM2 password listed above is used as the basis for the flow diagram. The EHLLAPI process begins in step 250 to test whether the host prompts for the node ID and user ID by displaying a screen for these parameters. The screen will display a message or keytext such as "MSG10" If the host is requesting the node ID and user ID parameters, the process proceeds to step 252 where the server portion of the remote password administration facility sends the host the node ID, user ID and the enter key. The password facility obtains the node id and user id from the host response file and the user ID from the input SQLDA from the client in step 154 in FIG. 6. In the host response file, step 252 is listed as "VM2 #U@E", for the node ID and user ID.

Next, the host will determine whether the user ID is valid. The password facility on the server will perform a Q test in step 254 for the character string "not in CP" which the host will return if the user ID is not valid. If "not in CP" is found, i.e., the user ID is not valid, the password facility will send the host the logoff command and the enter key, or "logoff@E" in the host response file. If the host determines that the user and node ID are valid, the host will prompt for the password. A test is performed in step 258 for the password prompt. If the password prompt display is found, the password facility on the server sends the host the password, the new password and the new password (a second time for confirmation) and the enter key. In the host response file, this is listed as "#P/#N/#N@E".

The host will determine whether the current password is invalid. If the current password is invalid, the host will display a message such as "incorrect password". A test is performed by the password facility at the server in step 262 for the "incorrect password" screen. If the server finds that screen, in step 264, it will send the host the logoff command and the enter key. The host security system will often have password criteria which the new password must meet for acceptance as a valid password. Also, it checks to see that the new password was entered the same way twice. If the new password does not meet these criteria, the host considers the new password to be invalid and will display a message to that effect. In step 266, a test is performed by the password facility at the server for an "invalid" message. If the message is found, the facility will send the host the logoff command and the enter key, step 268.

The remote password administration facility at the server will also test for a "holding" message which may be sent by the host, in step 270. The host screen may be filled with messages from a successful logon attempt, for example. If the "holding" message is found, the facility will send the host a clear screen key in step 272. Other similar tests for "SYSNEWS" and "MORE" messages are listed in the host response file, but are not depicted in FIG. 8. At this point, the host security system has finished, the password change process and will display a screen which allows a user access to his host files and disk space. A typical screen will display "PROFS" or "READY". A test, step 280, is performed for the screen which indicates that the password change process is complete in the host security system. At this point, since the password administration facility is only concerned with changing the password, it sends the host the logoff command and the enter key in step 282. The results of the password change procedure are returned to the client portion of the remote password administration facility in step 284.

FIG. 9 depicts the user interface presented on the client server. A dialog box 300 having the title Database Manager Remote Password Administration and the title Bar 301, includes five entry fields 302, 303, 304, 305, 306 to input the user ID, the current password, the new password, the new password (the second time for verification) and the remote workstation to which the password update message should be sent. The dialog box 300 also includes a change push button 307 and a quit push button 308. The change push button 307 is used to start the remote password administration facility, the quit push button 308 is used to end it. The remote workstation does not need to be entered as the RPAF can perform a table lookup of all remote nodes to which the user is entitled access instead. After the information is entered, the change push button 307 is selected by the user. The user password will be changed at both the gateway server and the associated host system coupled to the gateway server. The password can be changed at the client system either by the remote password administration facility or by UPM.

When transmitting passwords from the DBM client to the DBM server and host data encryption should be performed. It is relatively easy to encrypt between client and server on the network with a matched set of encryption/decryption modules. However, it would be very difficult to encrypt the password procedure for the host system unless the host security system were modified to expect an encrypted procedure. However, this is not necessary. The passwords and user IDs can be transmitted in the clear, at a certain security risk.

While the invention has been described with respect to particular embodiments above, it will be understood by those skilled in the art that modifications may be made without departing from the spirit and scope of the present invention. These embodiments are for purposes of example and illustration only and are not to be taken to limit the scope of the invention narrower than the scope of the appended claims.

We claim:

1. In a computer network having a plurality of nodes with one or more computer systems coupled to a node, a method of administering a password in a first and second type of security system, the first and second security systems having incompatible security procedures comprising the steps of:

transmitting a password update message from a first computer system equipped with the first type of security system to a second computer system over the network according to the procedure of the first type of security system;

receiving the password update message at the second computer system equipped with the first type of security system;

determining authorized computer systems in the network to which the user is authorized access, the authorized computer systems including a third computer system equipped with the second type of security system;

transmitting the password update message to the authorized computer systems, wherein the password update message is transmitted to the third computer system according to the procedure of the second type of security system;

updating password tables in the first types of and second security systems at the second and third computer systems with the password update message; and transmitting a password status message to the first computer system to indicate that the password tables in the first and second security systems were updated at the second and third computer systems.

2. The method as recited in claim 1 wherein the process for updating the password table in the second type of security system comprises the steps of:

initiating a dialog with the third computer system by the second computer system;

searching for a first screen display of the third system by the second computer system;

responsive to finding the first screen display, entering user identifier data from the password update message to the third computer system by the second computer system;

searching for a second screen display of the third computer system by the second computer system;

responsive to finding the second screen display, entering old password data from the password update message to the third computer system by the second computer system;

searching for a third screen display of the third computer system by the second computer system; and, responsive to finding the third screen display, entering new password data from the password update message to the third system by the second computer system.

3. The method as recited in claim 1 which further comprises the step of transmitting a password status message to the first computer system to indicate that the password tables in the first and second security systems were updated at the second and third computer systems.

4. The method as recited in claim 1 wherein a plurality of remote computer systems in the authorized computer systems are equipped with the first type of security system;

transmitting the password update message to the plurality of remote computer systems according to the procedure of the first type of security system; and, updating a password table in the first type of security system at each of the plurality of remote computer systems.

5. The method as recited in claim 1 which further comprises the step of translating the password update message from a first format for the first type of security system to a second format for the second type of security system, the translating step taking place at the second computer system.

6. The method as recited in claim 1 wherein the third computer system is a host mainframe computer and which further comprises the steps of:

emulating a host terminal session by the second computer system;

searching for a plurality of successive host screen displays in the host terminal session by the second computer system; and, responsive to finding one of the plurality of successive host screens, sending a portion of the data from the password update message to the third computer system by the second computer system.

7. In a computer network having a plurality of nodes with one or more computer systems coupled to a node, a system of administering a password for a first and second type of security system having incompatible security procedures comprising:

a first and second computer system coupled to a first and second node of a network respectively;

means for transmitting a password update message from the first computer system to the second computer system over the network according to the security procedure of the first type of security system;

means for receiving the password update message at the second computer system, the second computer system equipped with the first type of security system;

a third computer system coupled to and in communication with the second computer system;

means for determining authorized computer systems in the network to which the user is authorized access, the authorized computer systems including a third computer system equipped with the second type of security system;

means for transmitting the password update message to the authorized computer systems, wherein the password update message is transmitted to the third computer system responsive to finding a set of security related screen messages from the third computer system and according to the security procedure of the second type of security system; and, means for updating password tables in the first and second type of security systems with the password update message.

8. The system as recited in claim 7 wherein the system further comprises:

means for initiating a dialog with the third computer system by the second computer system;

means for searching for a first, second and third screen display of the third computer system by the second computer system;

means responsive to finding the first, second and third screen displays, respectively entering user identifier data, old password data and new password data from the password update message to the third computer system by the second computer system.

9. The system as recited in claim 7 which further comprises means for transmitting a password status message to the first computer system to indicate that the password tables in the first and second types of security systems were updated.

10. The system as recited in claim 7 a plurality of remote systems in the authorized computer systems equipped with the first type of security system;

means for transmitting the password update message to the plurality of remote computer systems according to the procedure of the first security system; and, means for updating a password table in the first type of security system at each of the plurality of remote computer systems.

11. The system as recited in claim 7 wherein the third computer system is a mainframe computer.

12. The system as recited in claim 7 which further comprises means for translating the password update message from a first format for the first type of security system to a second format for the second type of security system, the translating means at the second computer system.

13. The system as recited in claim 7 wherein the third computer system is a host mainframe computer and which further comprises:

means for emulating a host terminal session the second computer system;

means for searching for a plurality of successive host screen displays in the host terminal session by the second computer system; and, means to finding one of the plurality of successive host screens, for sending a portion of the data from the password update message to the third computer system by the second computer system according to the procedure of the second security system.

14. For a computer network having a plurality of nodes with one or more computer systems coupled to a node, a computer program product resident on a computer readable memory for administering a password in a first and second type of security system having incompatible security procedures executable in the one or more computer systems, comprising:

program code means for transmitting a password update message from a first computer system to a second computer system over the network according to the procedure of the first security system;

program code means for receiving the password update message at the second computer system equipped with the first type of security system;

program code means for determining authorized computer systems in the network to which the user is authorized access, the authorized computer systems including a third computer system equipped with the second type of security system;

program code means for receiving screen messages from the second type of security system at the second computer system program code means for transmitting the password update message to the authorized computer systems, wherein the password update message is transmitted to the third computer system by the second computer system in successive portions according to the procedure of the second security system each successive portion being transmitted responsive to receiving a predetermined screen message from the second security system; and, program code means for updating password tables in the second and third computer systems with the password update message.

15. The product as recited in claim 14 which further comprises:

program code means for initiating a dialog with the third system from the second system;

program code means for searching for a first, second and third screen display by the third system;

program code means responsive to finding the first, second and third screen displays, respectively entering user identifier data, old password data and new password data from the password update message to the third system.

16. A computer program product on a computer readable medium for administering a password in a computer network wherein individual computer systems run either a first or a second type of security system which have mutually incompatible security procedures, comprising:

means for transmitting a password update message to a second computer system according to the procedure of the first security system from a first computer system;

means for receiving the password update message at the second computer system and updating a password table in the first security system at the second computer system;

means for transmitting the password update message from the second computer system to a third computer system according to the procedure of the second security system means for receiving the password update message at the third computer system and updating a password table in the second security system at the third computer system; and means for transmitting a password status message to the first system to indicate that the password tables in the first and second types of security systems were updated.

17. The product as recited in claim 14 wherein
a plurality of remote systems in the authorized computer systems are equipped with the first type of security system and the product further comprises:

program code means for transmitting the password update message to the plurality of remote systems; and, program code means for requesting an update to a password table in the first type of security system at each of the plurality of remote systems.

18. The product as recited in claim 14 which further comprises program code means for translating the password update message from a first format for the first type of security system to a second format for the second type of security system, the translating step taking place at the second system.

19. The product as recited in claim 14 wherein the third system is a host mainframe computer and which further comprises:

program code means for emulating a host terminal session at the second system;

program code means for searching for a plurality of successive host screen displays in the host terminal session; and, program code means responsive to finding one of the plurality of successive host screens, for sending a portion of the data from the password update message to the third system.

* * * * *